(12) United States Patent
Tong (10) Patent No.: US 12,277,596 B2
(45) Date of Patent: Apr. 15, 2025

(54) TWO-DIMENSIONAL CODE IDENTIFICATION METHOD AND DEVICE, AND MOBILE TERMINAL

(71) Applicant: ADVANCED NEW TECHNOLOGIES CO., LTD., Grand Cayman (KY)

(72) Inventor: Jun Tong, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 0 days.

(21) Appl. No.: 17/827,255

(22) Filed: May 27, 2022

(65) Prior Publication Data

US 2022/0292590 A1    Sep. 15, 2022

Related U.S. Application Data

(63) Continuation of application No. 16/256,849, filed on Jan. 24, 2019, now Pat. No. 11,393,017, which is a
(Continued)

(30) Foreign Application Priority Data

Jul. 27, 2016    (CN) .......................... 201610602558.6

(51) Int. Cl.
    *G06Q 30/00*      (2023.01)
    *G06K 7/14*       (2006.01)
    *G06Q 30/0601*   (2023.01)

(52) U.S. Cl.
    CPC ....... *G06Q 30/0643* (2013.01); *G06K 7/1417* (2013.01); *G06Q 30/0623* (2013.01); *G06Q 30/0633* (2013.01)

(58) Field of Classification Search
CPC .......... G06Q 30/0643; G06Q 30/0623; G06Q 30/0633; G06K 7/1417
See application file for complete search history.

(56) References Cited

U.S. PATENT DOCUMENTS 8,997,241 B2 * 3/2015 Terwilliger ............. G06F 21/36
                                                713/172
9,027,837 B2   5/2015  Hwang
(Continued)

FOREIGN PATENT DOCUMENTS

CN        101807241 A     8/2010
CN        102185878 A     9/2011
(Continued)

OTHER PUBLICATIONS

"Vasco Expands Cronto Visual Authorization and Transaction Signing Product Line with Digipass 770," PR Newswire [New York ], Mar. 16, 2016 (Year: 2016).*

(Continued)

*Primary Examiner* — Anne M Georgalas
(74) *Attorney, Agent, or Firm* — Sheppard Mullin Richter & Hampton LLP (57) ABSTRACT

This application discloses a two-dimensional code identification method, device and a mobile terminal. The two-dimensional code identification method comprises: sensing a capture operation performed by a user on an application interface, the application interface containing a two-dimensional code; in response to the sensed capture operation, capturing an image of the application interface; scanning the image to obtain two-dimensional code information of the two-dimensional code contained in the image.

17 Claims, 5 Drawing Sheets

Related U.S. Application Data continuation of application No. PCT/CN2017/093549, filed on Jul. 19, 2017.

(56) References Cited

U.S. PATENT DOCUMENTS

| | | | |
|---|---|---|---|
| 9,400,978 B2 | 7/2016 | Laracey | |
| 9,734,498 B2 | 8/2017 | Itwaru | |
| 2012/0023131 A1* | 1/2012 | Downey | H04N 21/812 |
| | | | 707/769 |
| 2012/0027301 A1 | 2/2012 | Schloter et al. | |
| 2012/0038668 A1 | 2/2012 | Kim et al. | |
| 2012/0072953 A1* | 3/2012 | James | G06F 3/04883 |
| | | | 345/173 |
| 2012/0134548 A1 | 5/2012 | Rhoads et al. | |
| 2012/0138671 A1 | 6/2012 | Gaede et al. | |
| 2012/0209749 A1* | 8/2012 | Hammad | G06Q 20/20 |
| | | | 705/27.1 |
| 2012/0314096 A1 | 12/2012 | Kruglick | |
| 2014/0104091 A1 | 4/2014 | Wang | |
| 2014/0112551 A1 | 4/2014 | Terwilliger et al. | |
| 2014/0120886 A1 | 5/2014 | Xu | |
| 2014/0236475 A1 | 8/2014 | Venkatraman et al. | |
| 2014/0281855 A1 | 9/2014 | Bhatnagar | |
| 2014/0314320 A1* | 10/2014 | Bae | G06F 18/2113 |
| | | | 382/190 |
| 2014/0320722 A1 | 10/2014 | Cho et al. | |
| 2014/0337175 A1* | 11/2014 | Katzin | G06Q 20/326 |
| | | | 705/26.62 |
| 2015/0082230 A1* | 3/2015 | Lee | G06F 3/0482 |
| | | | 715/781 |
| 2015/0248664 A1 | 9/2015 | Makhdumi et al. | |
| 2015/0302421 A1 | 10/2015 | Caton et al. | |
| 2016/0125214 A1 | 5/2016 | Huang et al. | |
| 2016/0140375 A1* | 5/2016 | Luo | G06K 7/1417 |
| | | | 235/462.09 |
| 2016/0155112 A1* | 6/2016 | Phillips | G06Q 20/3276 |
| | | | 235/379 |
| 2017/0024722 A1 | 1/2017 | Mhun et al. | |
| 2018/0075155 A1 | 3/2018 | Lee et al. | |
| 2019/0251623 A1 | 8/2019 | Tong | |

FOREIGN PATENT DOCUMENTS

| | | | |
|---|---|---|---|
| CN | 102541547 A | | 7/2012 |
| CN | 103218595 A | | 7/2013 |
| CN | 103268548 A | | 8/2013 |
| CN | 103765453 A | | 4/2014 |
| CN | 104090761 A | * | 10/2014 |
| CN | 104573597 A | | 4/2015 |
| CN | 103023917 B | | 3/2016 |
| CN | 103236935 B | | 4/2016 |
| CN | 103001973 B | | 8/2016 |
| CN | 102821157 B | | 9/2016 |
| CN | 103279730 B | | 9/2016 |
| CN | 106372869 A | | 2/2017 |
| CN | 106874817 A | | 6/2017 |
| EP | 2701112 A1 | | 2/2014 |
| JP | 2007172471 A | * | 7/2007 |
| JP | 2009-098741 A | | 5/2009 |
| JP | 2014-505896 A | | 3/2014 |
| JP | 2015191531 A | | 11/2015 |
| JP | 2016-527633 A | | 9/2016 |
| KR | 10-2012-0046571 A | | 5/2012 |
| KR | 20120106519 A | | 9/2012 |
| KR | 20130115332 A | | 10/2013 |
| KR | 10-2014-0115243 A | | 9/2014 |

OTHER PUBLICATIONS

Written Opinion of the International Searching Authority and International Search Report for PCT Application No. PCT/CN2017/093549 mailed on Sep. 28, 2017 (14 pages).
International Preliminary Report on Patentability Chapter I for PCT Application No. PCT/CN2017/093549 mailed on Feb. 7, 2019 (12 pages).
Non-final rejection and Search Report for Taiwanese Application No. 106119138 mailed on May 31, 2019 (6 pages).
First Office Action and First Search for Chinese Application No. 201610602558.6 mailed on Sep. 19, 2018 with English machine translation (18 pages).
Second Office Action for Chinese Application No. 201610602558.6 mailed on Mar. 28, 2019 with English machine translation (8 pages).
Notice to Submit Response for Korean Application No. 10-2019-7005827 mailed on Sep. 27, 2019 (10 pages).
Search Report for European Application No. 17833472.8 mailed on Feb. 13, 2020.
Office Action for Korean Application No. 10-2019-7005827 mailed on Mar. 27, 2020.
Office Action for Japanese Application No. 2019-504006 mailed on Jul. 14, 2020.
First Office Action for Taiwanese Application No. 106119138 mailed on May 31, 2019, with machine English translation, 10 pages.
Notice of Allowance for Korean Application No. 10-2019-7005827, mailed on Oct. 21, 2020, 3 pages.
Office Action for Japanese Application No. 2019-504006 mailed on Mar. 30, 2021.
The App's the Thing, by Tony Klejna, Streaming Media Magazine: 40-42, 44, 46-47, Medford: Information Today, Inc. (Oct.-Dec. 2011) (Year: 2011).
"Websites are being replaced," by Dan Fisher, American Bankers Association, ABA Banking Journal, Jan. 2012 (Year: 2012).
Hearing Notice for Indian Application No. 201947002715 mailed on Jun. 26, 2024.

* cited by examiner

TWO-DIMENSIONAL CODE IDENTIFICATION METHOD AND DEVICE, AND MOBILE TERMINAL

CROSS-REFERENCE TO RELATED APPLICATIONS

This application is a continuation of U.S. patent application Ser. No. 16/256,849, filed on Jan. 24, 2019, which is a continuation application of International Patent Application No. PCT/CN2017/093549, filed on Jul. 19, 2017. The International Patent Application No. PCT/CN2017/093549 is based on and claims priority to the Chinese Patent Application No. 201610602558.6, filed on Jul. 27, 2016 and entitled "TWO-DIMENSIONAL CODE IDENTIFICATION METHOD AND DEVICE, AND MOBILE TERMINAL." The above-referenced applications are incorporated herein by reference in their entirety.

TECHNICAL FIELD

This application relates to the technical field of graphic images, and in particular to a two-dimensional code identification method and device, and mobile terminal.

BACKGROUND

A two-dimensional code is also called a two-dimensional bar code. It uses a graphic of lines and spaces, formed by a particular geometric graphic distributed along a plane (two-dimensional direction) according to given rules, to record data symbol information. A two-dimensional code is characterized by a large capacity for information, a wide range of coding, strong fault-tolerance, and high decoding reliability. In addition, it has the advantages of being low-cost and easy to fabricate. Therefore, two-dimensional codes are widely used in people's lives.

With the development of the Internet and the popularization of mobile terminals, the uses of two-dimensional codes on mobile terminals are increasing daily. When using a two-dimensional code on a mobile terminal, identification is first performed. After a two-dimensional code appears in a given application on a terminal (referred to as the first terminal; this may be a PC terminal, mobile terminal, etc.), in the current technologies, a terminal other than the first terminal (referred to as the second terminal) usually needs to invoke its own camera function to scan the two-dimensional code, thereby obtaining the information stored in the two-dimensional code, and then achieving a variety of functions on the second terminal, such as payment functions, positioning, and social functions.

This shows that the current technologies often needs another terminal other than the terminal displaying the two-dimensional code to perform identification of the two-dimensional code. This is inconvenient for users. For example, when a user uses a mobile terminal to watch a live broadcast, and the user wants to scan a two-dimensional code appearing at the bottom of the screen of the mobile terminal, and then implement relevant functions corresponding to that two-dimensional code, the current technologies have no better way to meet this need than using another device.

SUMMARY

The main objective of this specification is to provide a two-dimensional code identification method, device, and mobile terminal. It is aimed at solving the problem in existing two-dimensional code identification methods, in that they cannot perform identification of a two-dimensional code in an application interface image in an application displayed on the display element of a mobile terminal.

According to one aspect, this specification provides a method for two-dimensional code identification, comprising: sensing a capture operation performed by a user on an application interface, the application interface containing a two-dimensional code; in response to the sensed capture operation, capturing an image of the application interface; and scanning the image to obtain two-dimensional code information of the two-dimensional code contained in the image.

In some embodiments, after obtaining the two-dimensional code information of the two-dimensional code contained in the image, the method further comprises: displaying a function operation interface corresponding to the obtained two-dimensional code information. In some embodiments, the method may further comprise performing a function corresponding to the obtained two-dimensional code information.

In some embodiments, the image contains multiple two-dimensional codes. In some embodiments, after obtaining the two-dimensional code information of the multiple two-dimensional codes contained in the image, the method further comprises: displaying an item list, the item list containing multiple function operation interface items each corresponding to one of the multiple two-dimensional codes for responding to an operation performed by the user on the function operation interface items in the item list, and entering into a corresponding function operation interface.

In some embodiments, the capture operation performed by the user on the application interface comprises the user operating on a virtual component on the application interface. In some embodiments, he capture operation performed by the user on the application interface comprises the user operating on a physical button.

According to another aspect, this specification provides a device for two-dimensional code identification, the device comprising one or more processors and one or more non-transitory computer-readable memories coupled to the one or more processors and configured with instructions executable by the one or more processors to cause the device to perform operations comprising: sensing a capture operation performed by a user on an application interface, the application interface containing a two-dimensional code; in response to the sensed capture operation, capturing an image of the application interface; and scanning the image to obtain two-dimensional code information of the two-dimensional code contained in the image.

According to still another aspect, this specification provides a non-transitory computer-readable memory to be coupled to one or more processors and configured with instructions executable by the one or more processors to cause the one or more processors to perform operations comprising: sensing a capture operation performed by a user on an application interface, the application interface containing a two-dimensional code; in response to the sensed capture operation, capturing an image of the application interface; and scanning the image to obtain two-dimensional code information of the two-dimensional code contained in the image.

Compared to current technologies, in the two-dimensional code identification method and device and mobile terminal of the embodiments of this specification, a two-dimensional code identification device or mobile terminal alone is used to capture an application interface image of an application interface displayed on a display element, and to scan the image so as to identify the two-dimensional code contained in the image. Thus, real-time identification may be performed for a two-dimensional code in the application interface image of an application interface displayed in real-time on a display element, and the operation is fast and convenient.

BRIEF DESCRIPTION OF THE DRAWINGS

The accompanying drawings described here are used to provide a further understanding of this application, and they are a part of this application. The illustrative embodiments of this application and their descriptions are used to explain this application, and they do not serve as improper limitations of this application. In the accompanying drawings.

DETAILED DESCRIPTION

To make the objectives, technical schemes, and advantages of this application clearer, a clear and comprehensive description of the technical schemes of this application is given below, in combination with the embodiments and corresponding accompanying drawings of this application. The described embodiments are merely some, rather than all, of the embodiments of this application. Based on the embodiments in this application, all other embodiments obtainable by those of ordinary skill in the art without creative effort shall fall within the scope of protection of this application.

The system will be described in further detail with reference to the accompanying drawings. In the following description, embodiments will be described in further detail with reference to the accompanying drawings. The same numerals represent the same elements.

The mobile terminal according to this specification is a device comprising a display element, and it may include, but is not limited to, any of the following devices: a personal computer (PC), a mobile device (such as a cell phone, a personal digital assistant (PDA), a digital camera, a portable game console, an MP3 player, a portable/personal multimedia player (PMP), a handheld e-book, a tablet PC, a portable laptop PC, and a global positioning system (GPS) navigator), a smart TV, etc.

In addition, the display element of the mobile terminal according to this specification may comprise a touch screen and a touch screen controller. Here, the touch screen may provide a user with user interfaces (UI) corresponding to various services (e.g., calling, data transmission, broadcasting, filming, payments, etc.), and it sends an analog signal corresponding to at least one touch on the UI to a touch screen controller. In the description of this specification, a "touch" may comprise a contact touch and a contactless touch. Here, a contact touch refers to at least one touch input through the user's body part (e.g., a finger) or a touch input instrument (e.g., a pen or stylus) that may be received by the touch screen. The touch screen also may receive a touch input signal corresponding to continuous movement of one touch or multiple touches. For example, a contact touch may comprise a single tap, double tap, drag, drag and drop, etc. The touch screen may send an analog signal corresponding to the continuous movement of an input touch to the touch screen controller.

A contactless touch is also called a hover touch. For example, a contactless touch is not limited to contact between the touch screen and the user's body part or a touch input instrument. Touch screens may have different detection intervals based on the properties and configuration of the mobile terminal. In addition, touch screens may be implemented as resistive, capacitive, infrared, or acoustic wave touch screens.

The touch screen controller converts the analog signal received from the touch screen into a digital signal (For example, X and Y coordinates). A controller may use the digital signal received from the touch screen controller to control the touch screen. For example, in response to the user's selection of a shortcut icon or button displayed on the touch screen, the mobile terminal according to this specification may display an application interface corresponding to the shortcut icon.

Figure 1:
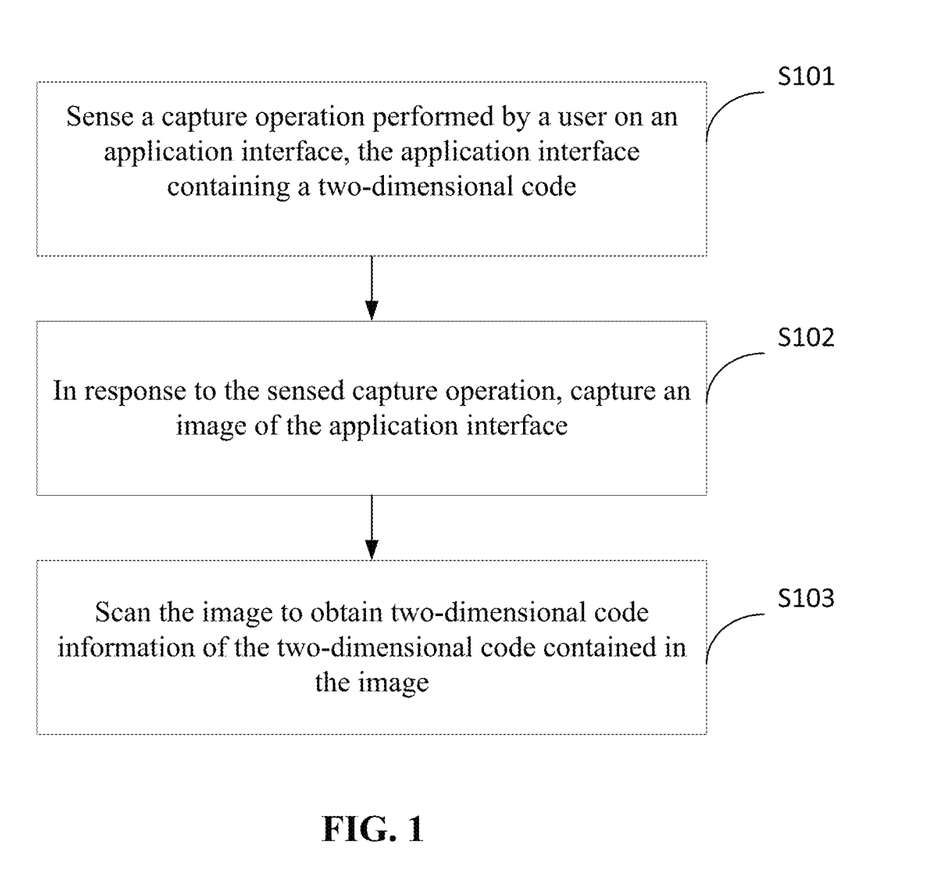
FIG. 1 is a flow diagram of a two-dimensional code identification method based on an embodiment of this specification.

FIG. 1 is a flow diagram of a two-dimensional code identification method according to an embodiment of this specification. As shown in FIG. 1, in S101, the method senses a capture operation performed by a user on an application interface. The application interface contains a two-dimensional code. For example, a user input is sensed when an application interface, including a two-dimensional code, of an application is displayed on a display element of a mobile terminal. Here, the user input refers to a user performing a capture operation to the application interface. For example, the user may select an application shortcut icon or button displayed on the display element, so the mobile terminal runs the application. At this time, the application interface of this application is displayed on the display element. For example, if the application is an instant messaging application (e.g., WeChat), then the application interface (e.g., a chat interface) of the instant messaging application is displayed on the display element of the mobile terminal. Next, the mobile terminal senses a capture operation performed by the user to the application interface. Here, the application may be an embedded application or third-party application stored in the storage element. An embedded application refers to a pre-installed application in a portable terminal device. For example, embedded applications may be browsers, emails, and instant messengers. Third-party applications are diverse, and refer to applications downloaded from online markets and installed on a mobile terminal, such as payment applications, shopping applications, and entertainment applications. Third-party application may be installed and controlled free of charge.

In addition, a user input may comprise the user's operation (e.g., touching) to a virtual component (e.g., virtual keyboard or virtual button, menu, text, image, number, or icon displayed on the display element) displayed on the display element of a mobile terminal, or the user's operation (e.g., pressing) to a physical button (e.g., small keyboard, actual button, etc.) on the mobile terminal. The virtual component may be displayed in any position on the display element, based on the user's settings. In some embodiments, during the operation process, the user may use a user input such as dragging to change the position of the virtual component on the display element. For example, when the user expects a two-dimensional code displayed on the display element of the mobile terminal to be identified, the user may touch/select a virtual button displayed on the display element, or press a physical button on the mobile terminal. A detailed explanation of the "touch" in this specification has been given above; a detailed description will not be repeated here.

For example, the user may touch a shortcut icon displayed on the screen of the display element. In this situation, the mobile terminal will run the application corresponding to the icon, such as a live broadcast application or shopping application. At the same time, the application interface of this application, containing a two-dimensional code, is displayed on the display element of the mobile terminal. Next, the user may directly use a finger or a stylus to touch a virtual component displayed on the display element, or the user may directly hover a finger over a virtual component on the display element, or the user may press a physical key on the mobile terminal or simultaneously press two physical keys on the mobile terminal, to trigger the following process.

Next, in S102, in response to the sensed capture operation, the method captures an image of the application interface. For example, in response to the capture operation, an application interface image of the application interface displayed on the display element of the mobile terminal is captured; that is, in response to the capture operation, a screen shot of the mobile terminal's current screen is captured. For example, the user may perform a screen shot of the currently displayed image by touching a virtual button on the display element, to capture the image of the application interface currently displayed on the display element of the mobile terminal. As another example, the user may perform a screen shot of the currently displayed application interface image by pressing a physical key on a mobile phone. In some embodiments, based on the embodiments of this specification, the user may store the image in the mobile terminal's storage element.

In S103, the method scan the image to obtain two-dimensional code information of the two-dimensional code contained in the image. For example, the application interface image is scanned and the two-dimensional code information contained in the application interface image is identified. That is, a full-screen scan of the application interface image may be performed to identify all two-dimensional codes in the image. For example, the mobile terminal according to the embodiments of this specification may convert an image containing a two-dimensional code into a binary image and perform a dilation operation on the binary image to obtain a dilated binary image. Next, the mobile terminal detects the edges of the dilated binary image to obtain a contour of the two-dimensional code's bar-shaped region, and this contour is corrected and segmented to obtain a complete and standard bar code image. Afterward, grid sampling is performed on this standard bar code image (i.e., the image pixels at each point of intersection in the grid are sampled) to build a bitmap (determining whether the sampled pixels are dark colors or light colors based on a threshold value) and to obtain binary data of the bar code region. Error correction and translation are performed on the obtained binary data of the bar code region, and the obtained binary data of the bar code region is converted into data codewords, thereby identifying all two-dimensional codes in the image.

This specification is not limited to the two-dimensional code identification technology mentioned above. Examples are used merely to describe the current two-dimensional code identification technology. Any technology for identifying two-dimensional codes in an image may be used here.

In some embodiments, after the two-dimensional codes are identified, based on the two-dimensional code information identified from the application interface image, a function operation interface corresponding to the identified two-dimensional code information may be displayed on the display element of the mobile terminal. That is, a corresponding application is launched from the mobile terminal based on the two-dimensional code identification result. The application refers to an embedded application or third-party application in the storage element, as described earlier, Therefore, for conciseness and clarity, it will not be explained again here.

For example, if the two-dimensional code information relates to an Alipay link, the mobile terminal invokes the Alipay application; thus, an Alipay application interface is displaced on the display element. If the two-dimensional code information related to a WeChat link, the mobile terminal invokes the WeChat application; thus, a WeChat application interface is displayed on the display element. If the two-dimensional code information relates to a URL link, the mobile terminal invokes a browser application; thus, a browser application interface is displayed on the display element.

The preceding shows a situation in which the application interface image displayed on a display element comprises one two-dimensional code; this specification describes a situation in which the displayed application interface image does not comprise a two-dimensional code. The following is a detailed description of a situation in which an application interface image displayed on the display element of a mobile terminal comprises multiple two-dimensional codes, in reference to FIG. 2.

Figure 2:
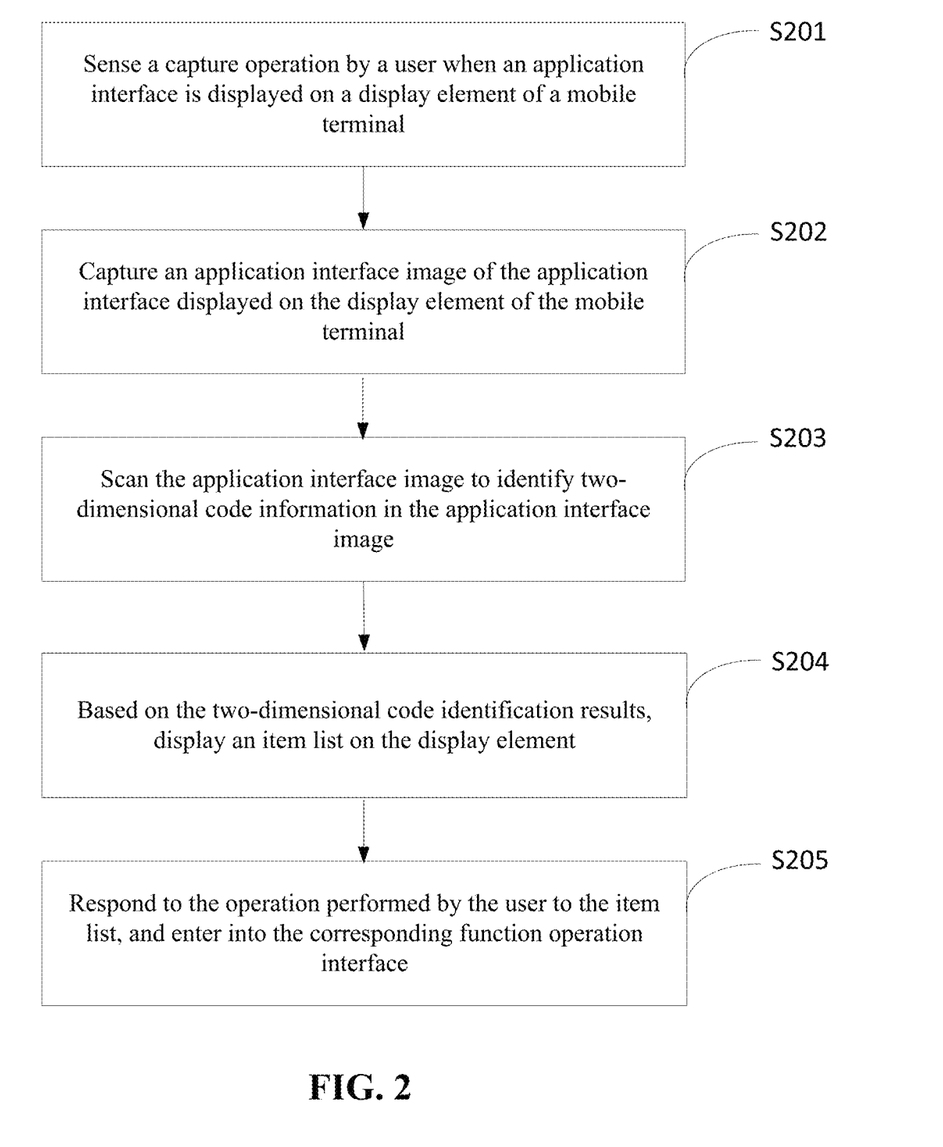
FIG. 2 is a flow diagram of a two-dimensional code identification method based on another embodiment of this specification.

FIG. 2 is a flow diagram of a two-dimensional code identification method based on another embodiment of this specification. For example, FIG. 2 shows a two-dimensional code identification method when an application interface image displayed on the mobile terminal comprises multiple two-dimensional codes.

Referring to FIG. 2, in S201, with the application interface displayed on the display element of the mobile terminal comprising two-dimensional codes, a capture operation performed by a user to the application interface is sensed. Next, in S202, in response to the capture operation, the application interface image of the application interface displayed on the display element of the mobile terminal is captured. Then, in S203, the application interface image is scanned and the two-dimensional code information contained in the application interface image is identified. Steps S201 through S203 in FIG. 2 are the same as Steps S101 through S103 in FIG. 1. They will not be described again, because a detailed explanation has been provided in FIG. 1.

Next, in S204, based on the two-dimensional code identification results, an item list is displayed on the display element of the mobile terminal. The item list containing the function operation interface items each corresponding to each of the multiple two-dimensional codes, in order to respond to the operation performed by the user on the function operation interface items in the item list, and enter into the corresponding function operation interface. For example, if the application interface image comprises three two-dimensional codes, after this image is scanned, three two-dimensional codes may be separately identified. Next, a list of function operation interface items corresponding to the three two-dimensional codes is displayed on the display element. With function operation interface item list being displayed on the screen, in S205, the user selects the function operation interface item to be performed from the function operation interface item list. In some embodiments, the user may perform selection through touch input. The touch input comprises the user input designated in the above description.

Finally, based on the function operation interface item selected by the user, the display element of the mobile terminal according to this specification redirects to the application interface corresponding to this function operation interface item. Still taking three two-dimensional codes as an example, as described above, a function operation interface item list corresponding to the three two-dimensional codes is displayed on the display element. Next, the user may touch the desired function operation interface item. At this time, the display element of the mobile terminal redirects to the application interface corresponding to the touched function operation interface item.

As described above, the two-dimensional code identification method based on an exemplary embodiment of this specification, using only the mobile terminal itself, may perform identification of multiple two-dimensional codes displayed in the application interface of an application running on the mobile terminal and select the operation interface to be performed. Thus, with only a simple operation by the user, the mobile terminal may automatically identify multiple two-dimensional codes simultaneously displayed on the mobile terminal, and also enter into the desired operation interface on demand.

The following is a description of the two-dimensional code identification method according to this specification and its mobile terminal, with reference to application scenarios of this specification. Here, FIG. 3 is an application scenario in which the image comprises one two-dimensional code, and FIG. 4 is an application scenario in which the image comprises three two-dimensional codes.

Figure 3:
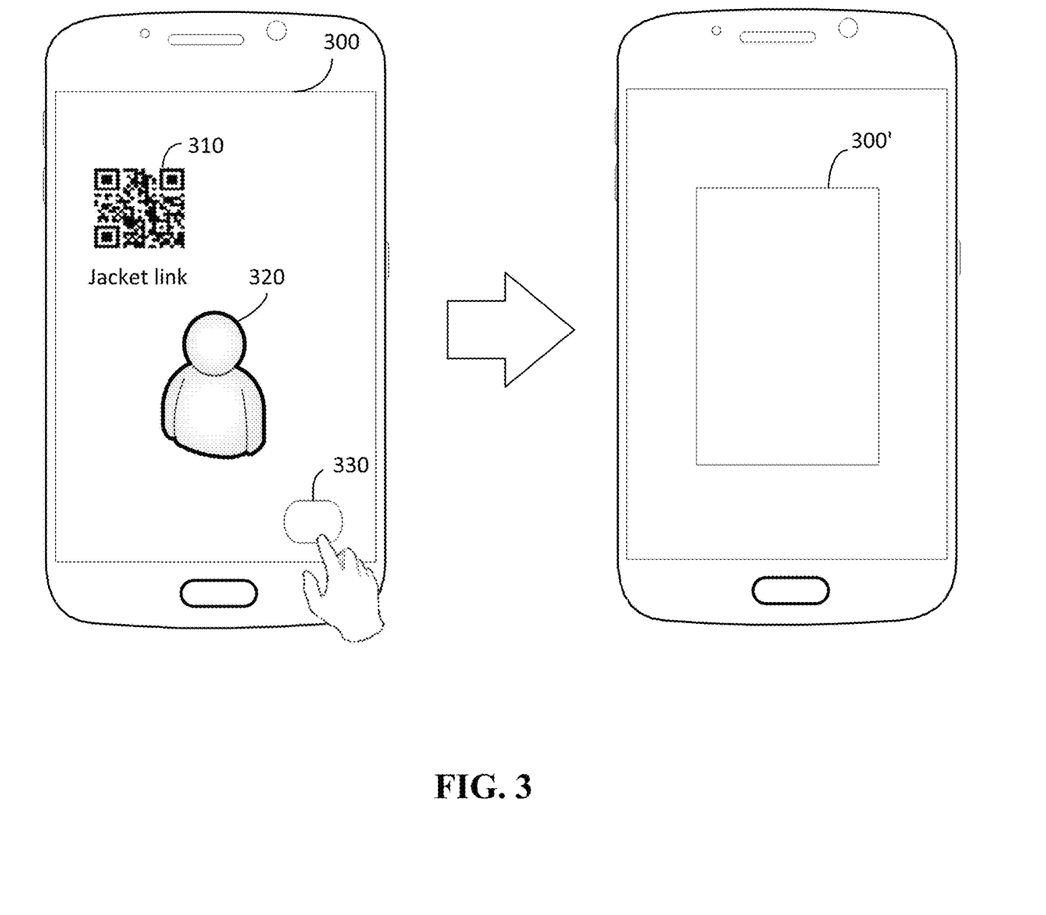
FIG. 3 is a diagram of two-dimensional code identification by a mobile terminal according to an embodiment of this specification.
Figure 4:
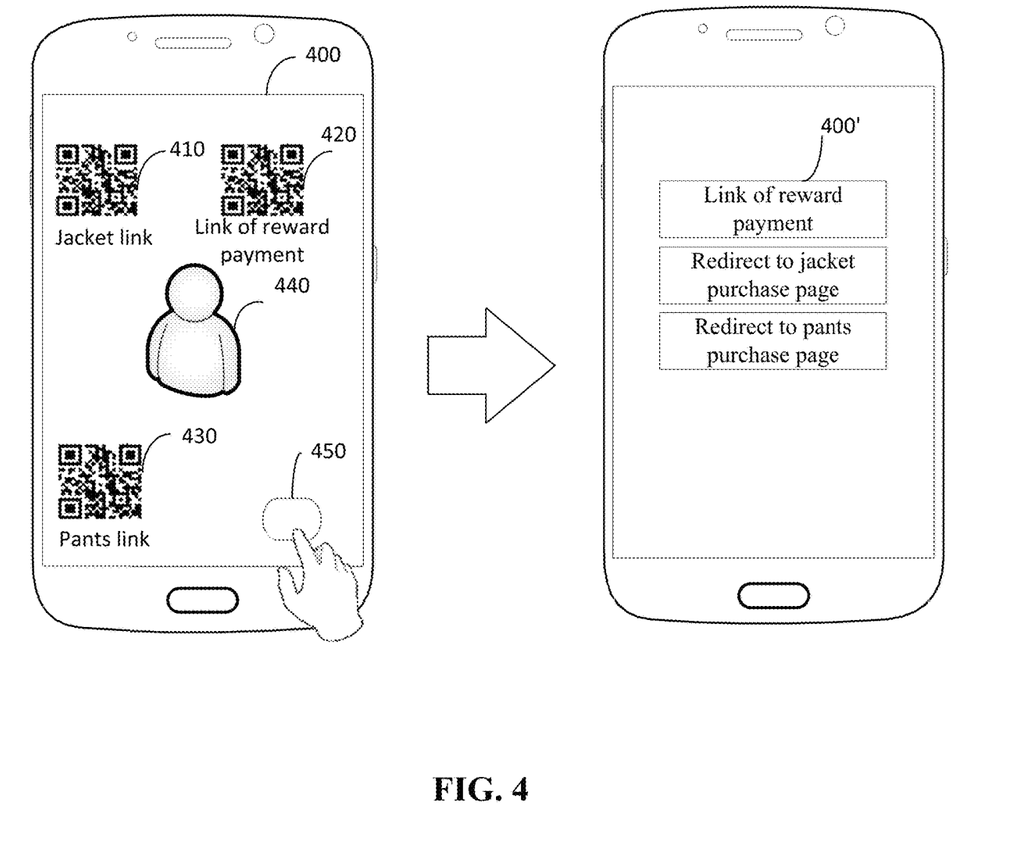
FIG. 4 is a diagram of two-dimensional code identification by a mobile terminal according to another embodiment of this specification.

FIG. 3 is a diagram of two-dimensional code identification by a mobile terminal according to an embodiment of this specification.

As shown in FIG. 3, a live broadcast application is launched in the mobile terminal of an embodiment of this specification. This specification is not limited to live broadcast applications. The mention of a live broadcast application here is merely used for the purpose of description, not limitation. This specification applies to any application capable of displaying an imaging comprising a two-dimensional code on a display element.

After launching the live broadcast application, the mobile terminal displays the application interface of the live broadcast application on the display element. That is, the mobile terminal displays an image 300 of a host 320 conducting a live broadcast on the display element. As shown in FIG. 3, the host 320 is displayed in the center of the image 300, and a two-dimensional code appears in the upper left corner of the image 300, e.g., a jacket link two-dimensional code 310 shown in FIG. 3.

At any time during the live broadcast, the user may perform an operation (e.g., touch operation) using a virtual button 330 in the display element, thereby identifying the two-dimensional code 310. Even though the button 330 in FIG. 3 appears in the lower right corner of the display element, this does not limit the location of the button 330. The button 330 may appear at any location in the display element, and the user may change the location of the button 330 as needed. In addition, even though the button 330 in FIG. 3 is a virtual component, a corresponding function may also be achieved through a physical button (not shown) or keyboard (not shown) on the mobile terminal, or through a virtual keyboard displayed on the display element. After an operation is performed on the button 330, the display element of a mobile terminal may redirect to interface 300'. Interface 300' may be a page for jacket purchase, or it may be a page for jacket payment.

In addition, image 300 may comprise multiple two-dimensional codes. The following is a description of an image comprising multiple two-dimensional codes, in reference to FIG. 4.

FIG. 4 is a diagram of two-dimensional code identification by a mobile terminal according to another embodiment of this specification.

Still using a live broadcast application as an example, after starting the live broadcast application, the mobile terminal displays the application interface of the live broadcast application on the display element. That is, the mobile terminal displays an image 400 of a host 440 conducting a live broadcast on the display element. As shown in FIG. 4, the host 440 is displayed in the center of the image 400, and there are multiple two-dimensional codes around the host 440. For example, in FIG. 4, there are three two-dimensional codes 410, 420, and 430. These three two-dimensional codes 410, 420 and 430 represent a jacket link, pants link, and a link of reward payment, respectively.

The user may operate the button 450 (e.g., touch operation) at any time during the live broadcast, thereby identifying the multiple two-dimensional codes 410, 420, and 430. Even though the button 450 in FIG. 4 appears in the lower right corner of the display element, this does not limit the location of the button 450. The button 450 may appear at any location in the display element, and the user may change the location of the button 450 as needed. In addition, even though the button 450 in FIG. 4 is a virtual component, a corresponding function may also be achieved through a physical button (not shown) or keyboard (not shown) on the mobile terminal, or through a virtual keyboard displayed on the display element.

After an operation is performed on the button 450, the display element of the mobile terminal may redirect to interface 400'. As shown in FIG. 4, interface 400' comprises the identified two-dimensional code information displayed in a list. For example, this list comprises items for redirecting to a link of reward payment, redirecting to a page for jacket purchase, and redirecting to a page for pants purchase. The user may select the operation to be performed from this function operation interface item list. For example, the user may select item for redirecting to the reward payment page. Then, the display element of a mobile terminal may redirect to the reward payment page. For example, the user may select the item for redirect to the page for jacket purchase, and then, the display element of the mobile terminal may redirect to the jacket purchase page.

Figure 5:
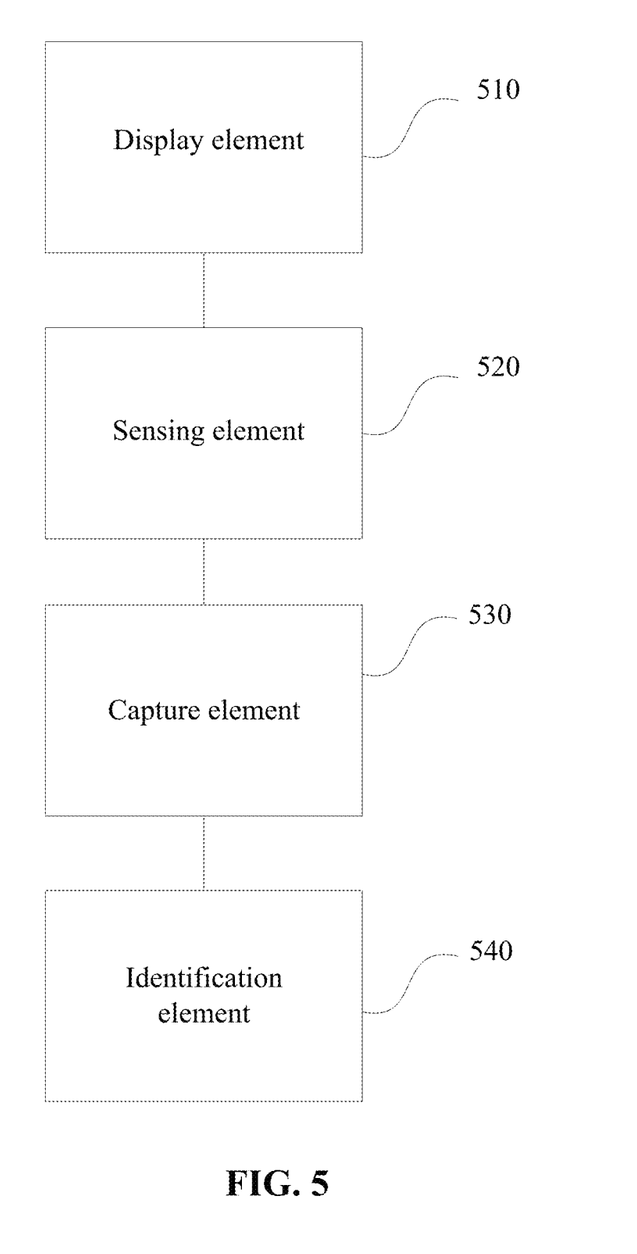
FIG. 5 is a block diagram of a two-dimensional code identification device according to an embodiment of this specification.

The following is a detailed description of a two-dimensional identification device according to an embodiment of this specification, in reference to FIG. 5.

FIG. 5 is a block diagram of a two-dimensional code identification device according to an embodiment of this specification. The mobile terminal described above refers to an apparatus comprising a two-dimensional code identification device. As a person skilled in the art will understand, the structure of the two-dimensional code identification device shown in FIG. 5 does not constitute a limitation of the mobile terminal of this specification. It may comprise more or fewer components than shown in the figure, a combination of certain components, or a different arrangement of components.

As shown in FIG. 5, the two-dimensional code identification device according to an embodiment of this specification comprises a display element 510, a sensing element 520, a capture element 530, and an identification element 540.

Here, the display element 510 is configured to display an application interface containing a two-dimensional code. For example, the user may select an application shortcut icon or button displayed on the display element, then the mobile terminal runs this application. At this time, this application interface containing a two-dimensional code is displayed on the display element. For example, when the mobile terminal has launched a live broadcast application, a frame of a host is displayed on the display element, as well as two-dimensional codes surrounding the frame of the host. As another example, when the mobile terminal has launched a shopping application, a frame of the merchandise to be purchased is displayed on the display element, as well as two-dimensional codes surrounding the merchandise frame.

The sensing element 520 is configured to sense a capture operation performed by a user to the application interface. Here, the capture operation performed by the user to the application interface may comprise user input (e.g., touching or selecting) through a virtual component (e.g., a virtual keyboard, menu, text, image, number, or icon displayed on the display element) displayed on the display element of a mobile terminal, or user input through a physical button (not shown) on the mobile terminal. Afterward, the capture element 530 captures an application interface image of the application interface displayed on the display element in response to the capture operation. For example, the user may perform a screen shot of the currently displayed image by tapping a virtual button on the display element, and may store the screen shot of the image in the mobile terminal's storage element (not shown). As another example, the user may perform a screen shot of the currently display image by pressing a physical key on the mobile terminal, and may store the screen shot of the image in the mobile terminal's storage element.

Afterward, the identification element 540 scans the application interface image and identifies the two-dimensional code information contained in the application interface image. An illustrative description of the two-dimensional code identification method has already been provided, which, for conciseness and clarity, will not be described again here.

After the identification element 540 identifies the two-dimensional code, the mobile terminal according to this specification may display the function operation interface corresponding to the identified two-dimensional code information on the display element 510, based on the result of two-dimensional code identification. For example, if the two-dimensional code identification result relates to an Alipay link, the mobile terminal invokes the Alipay application, thus displaying an operation interface for Alipay on the display element. If the two-dimensional code identification result relates to a WeChat link, the mobile terminal invokes the WeChat application, thus displaying an operation interface for WeChat on the display element. If the two-dimensional code identification result relates to a URL link, the mobile terminal invokes a browser application, thus displaying an operation interface for a browser on the display element.

In addition, in some embodiments, the mobile terminal according to this specification may also comprise a storage element, and the storage element may store captured application interface images. In addition, the storage element may also comprise embedded applications and third-party applications that can run on the mobile terminal.

In addition, the image on the mobile terminal may comprise multiple two-dimensional codes. Under these circumstances, after the identification element identifies multiple two-dimensional codes, the display element displays an item list, the item list containing the function operation interface items each corresponding to each of the multiple two-dimensional codes, in order to respond to the operation performed by the user to the function operation interface items in the item list, and enter into the corresponding function operation interface.

In some embodiments, the mobile terminal according to this specification may comprise: a display element, displaying an application interface containing a two-dimensional code; a sensing element, sensing a capture operation performed by a user to the application interface; a capture element, capturing an application interface image of the application interface displayed on a display element in response to the capture operation; and an identification element, scanning the application interface image and identifying the two-dimensional code information contained in the application interface image.

In the two-dimensional code identification method and device and mobile terminal provided by the embodiments of this specification, a two-dimensional code identification device or mobile terminal alone is used to capture, in real-time, an application interface containing a two-dimensional code displayed on a display element and to scan the image, thereby identifying the two-dimensional code information contained in the application interface image, and making the operation fast and convenient.

The executing entity of the steps of the method provided by Embodiment 1 may be the same device, or this method may use different devices as executing entities. For example, the executing entity for Step 21 and Step 22 may be Device 1, and the executing entity for Step 23 may be Device 2. As another example, the executing entity for Step 21 may be Device 1, and the executing entity for Step 22 and Step 23 may be Device 2; etc.

A person skilled in the art should understand that the embodiments of this application may be provided as a method, system, or computer program product. Therefore, this application may employ a pure hardware embodiment form, a pure software embodiment form, or an embodiment form that combines software and hardware. Also, this application may employ the form of one or more computer program products achieved through computer storage media (including but not limited to magnetic disc memory, CD-ROM, optical memory, etc.) comprising computer-executable program code.

This specification provides description in reference to flow diagrams and/or block diagrams of methods, devices (systems), and computer program products according to embodiments of this specification. Every flow and/or block in the flow diagrams and/or block diagrams, as well as combinations of the flows and/or blocks in the flow diagrams and/or block diagrams, may be achieved through computer program instructions. These computer program instructions may be provided to a processor of a generalpurpose computer, specialized computer, embedded processor, or other programmable data processing device to produce a machine, causing the instructions executed by the processor of a computer or other programmable data processing device to produce a device configured to achieve the functions designated in one or more flows of a flow diagram and/or one or more blocks of a block diagram.

These computer program instructions can also be stored in computer-readable memory that can cause a computer or other programmable data processing device to operate in a given mode, causing the instructions stored in this computer-readable memory to generate a product comprising an instruction apparatus. This instruction apparatus achieves the functions specified in one or more flows of a flow diagram and/or one or more blocks of a block diagram.

These computer program instructions can also be loaded onto a computer or other programmable data processing device, enabling the execution of a series of operation steps on the computer or other programmable device to produce computer processing. In this way, the instructions executed on the computer or other programmable device provide steps for achieving the specified functions of one or more flows in a flow diagram and/or one or more blocks in a block diagram.

In one typical configuration, the computation equipment comprises one or more processors (CPUs), input/output interfaces, network interfaces, and internal memory.

The internal memory may comprise the forms of volatile memory on computer-readable media, random access memory (RAM), and/or non-volatile RAM, such as read-only memory (ROM) or flash RAM. Internal memory is an example of computer-readable media.

Computer-readable media include permanent, nonpermanent, mobile, and immobile media, which can achieve information storage through any method or technology. The information may be computer-readable instructions, data structures, program modules, or other data. Examples of computer storage media include, but are not limited to, Phase-change RAM (PRAM), Static RAM (SRAM), Dynamic RAM (DRAM), other types of Random Access Memory (RAM), Read-Only Memory (ROM), Electrically Erasable Programmable Read-Only Memory (EEPROM), flash memory or other internal memory technologies, Compact Disk Read-Only Memory (CD-ROM), Digital Versatile Discs (DVD) or other optical memories, cassettes, magnetic tape and disk memories or other magnetic memory devices, or any other non-transmission media, which can be used for storing information that can be accessed by a computation device. According to the definitions herein, computer-readable media exclude transitory computer-readable media (transitory media), such as modulated data signals and carriers.

It should also be noted that the terms "comprise" and "contain" or any variations thereof are intended as non-exclusive inclusion. Thus, a process, method, product, or device comprising a series of elements does not comprise these elements only. It also comprises other elements not explicitly listed, or it also comprises elements inherent to that process, method, product, or device. When there are no other limitations, an element defined by the phrasing "comprising one . . . " does not exclude the presence of other, similar elements in the process, method, product, or device comprising the element.

A person skilled in the art should understand that the embodiments of this application may be provided as a method, system, or computer program product. Therefore, this application may employ a pure hardware embodiment form, a pure software embodiment form, or an embodiment form that combines software and hardware. Also, this application may employ the form of one or more computer program products achieved through computer storage media (including but not limited to magnetic disc memory, CD-ROM, optical memory, etc.) comprising computer-executable program code.

The preceding are merely embodiments of this application, which are not used to limit this application. Various modifications and changes to this application are available to a person skilled in the art. All revisions, equivalent substitutions, and improvements made within the spirit and principles of this application shall fall within the scope of protection of this application.

What is claimed is:

1. A computer-implemented method for two-dimensional code identification, the method comprising:
    launching, by a terminal device of an end user, a broadcast application installed on the terminal device;
    displaying, by the terminal device on a display of the terminal device, a video in the broadcast application, wherein the video comprises one or more of two-dimensional codes;
    sensing, by the terminal device, a capture operation performed by the end user on the display of the terminal device;
    in response to the sensed capture operation and that the video comprises only one two-dimensional code:
        determining, by the terminal device, that code information in the two-dimensional code relates to a second application; and
        automatically invoking, by the terminal device, the second application;
    in response to the sensed capture operation and that the video comprises a plurality of two-dimensional codes:
        obtaining, by the terminal device, a plurality of pieces of code information corresponding to the plurality of two-dimensional codes in the video; and
        displaying, by the terminal device, an item list comprising a plurality of function operation interfaces respectively corresponding to the plurality of pieces of code information, wherein the displaying the item list comprises redirecting the display to a full-screen display of the item list blocking the video in the broadcast application and the plurality of two-dimensional codes.

2. The method of claim 1, further comprising:
    while displaying the video and the plurality of two-dimensional codes on the display of the terminal device, displaying a virtual button on the display,
    wherein the sensing the capture operation performed by the end user comprises:
    sensing that the virtual button is triggered by the end user.

3. The method of claim 2, wherein the virtual button is movable on the display of the terminal device.

4. The method of claim 1, wherein the sensing the capture operation performed by the end user comprises:
    sensing a physical button of the terminal device is triggered by the end user.

5. The method of claim 1, further comprises:
    launching a third application in response to a user selection of one of the plurality of function operation interfaces in the item list, wherein the launching comprises:
    in response to a user-selected function operation interface corresponding to a payment link, launching a payment application installed in the terminal device; and in response to the user-selected function operation interface corresponding to an instant messaging application link, launching an instant messaging application installed in the terminal device.

6. The method of claim 1, further comprising:
responsive to the end user operating a function operation interface corresponding to one of the plurality of two-dimensional codes:
  invoking a third application specified by code information corresponding to the one two-dimensional code, and
  displaying an operation interface for the third application on the display of the terminal device.

7. The method of claim 1, wherein the broadcast application is a live broadcast application and the video is a live video.

8. A terminal device for two-dimensional code identification, the terminal device comprising one or more processors and one or more non-transitory computer-readable memories coupled to the one or more processors and configured with instructions executable by the one or more processors to cause the device to perform operations comprising:
  launching a broadcast application installed on the terminal device of an end user;
  displaying, on a display of the terminal device, a video in the broadcast application, wherein the video comprises one or more of two-dimensional codes;
  sensing a capture operation performed by the end user on the display of the terminal device;
  in response to the sensed capture operation and that the video comprises only one two-dimensional code:
  determining that code information in the two-dimensional code relates to a second application; and
  automatically invoking the second application;
  in response to the sensed capture operation and that the video comprises a plurality of two-dimensional codes:
  obtaining a plurality of pieces of code information corresponding to the plurality of two-dimensional codes in the video; and
  displaying an item list comprising a plurality of function operation interfaces respectively corresponding to the plurality of pieces of code information, wherein the displaying the item list comprises redirecting the display to a full-screen display of the item list blocking the video in the broadcast application and the plurality of two-dimensional codes.

9. The terminal device according to claim 8, wherein the operations further comprise:
  while displaying the video and the plurality of two-dimensional codes on the display of the terminal device, displaying a virtual button on the display,
  wherein the sensing the capture operation performed by the end user comprises:
  sensing that the virtual button is triggered by the end user.

10. The terminal device according to claim 9, wherein the virtual button is movable on the display of the terminal device.

11. The terminal device according to claim 8, wherein the video displays a broadcast host conducting a broadcast, the broadcast host is located at a center of the video; and
  the plurality of two-dimensional codes surround the broadcast host.

12. The terminal device according to claim 8, wherein the sensing the capture operation performed by the end user comprises:
  sensing a physical button of the terminal device is triggered by the end user.

13. The terminal device according to claim 8, wherein the operations further comprise:
  launching a third application in response to a user selection of one of the plurality of function operation interfaces in the item list, wherein the launching comprises:
  in response to a user-selected function operation interface corresponding to a payment link, launching a payment application installed in the terminal device; and
  in response to the user-selected function operation interface corresponding to an instant messaging application link, launching an instant messaging application installed in the terminal device.

14. A non-transitory computer-readable memory in a terminal device of an end user, the non-transitory computer-readable memory to be coupled to one or more processors and configured with instructions executable by the one or more processors to cause the one or more processors to perform operations comprising:
  launching a broadcast application installed on the terminal device of the end user;
  displaying, on a display of the terminal device, a video in the broadcast application, wherein the video comprises one or more of two-dimensional codes;
  sensing a capture operation performed by the end user on the display of the terminal device;
  in response to the sensed capture operation and that the video comprises only one two-dimensional code:
  determining that code information in the two-dimensional code relates to a second application; and
  automatically invoking the second application;
  in response to the sensed capture operation and that the video comprises a plurality of two-dimensional codes:
  obtaining a plurality of pieces of code information corresponding to the plurality of two-dimensional codes in the video; and
  displaying an item list comprising a plurality of function operation interfaces respectively corresponding to the plurality of pieces of code information, wherein the displaying the item list comprises redirecting the display to a full-screen display of the item list blocking the video in the broadcast application and the plurality of two-dimensional codes.

15. The non-transitory computer-readable memory according to claim 14, wherein the operations further comprise:
  while displaying the video and the plurality of two-dimensional codes on the display of the terminal device, displaying a virtual button on the display,
  wherein the sensing the capture operation performed by the end user comprises:
  sensing that the virtual button is triggered by the end user.

16. The non-transitory computer-readable memory according to claim 15, wherein the virtual button is movable on the display of the terminal device.

17. The non-transitory computer-readable memory according to claim 14, wherein the operations further comprise:
  launching a third application in response to a user selection of one of the plurality of function operation interfaces in the item list, wherein the launching comprises:
  in response to a user-selected function operation interface corresponding to a payment link, launching a payment application installed in the terminal device; and in response to the user-selected function operation interface corresponding to an instant messaging application link, launching an instant messaging application installed in the terminal device.

\* \* \* \* \*